United States Patent Office 3,011,887
Patented Dec. 5, 1961

3,011,887
DEFOLIATING COTTON PLANTS WITH BIS-XANTHATES
Harold E. Cupery and Norman E. Searle, Wilmington, Del., assignors to E. I. du Pont de Nemours and Company, Wilmington, Del., a corporation of Delaware
No Drawing. Substituted for abandoned application Ser. No. 351,038, Apr. 24, 1953. This application June 26, 1958, Ser. No. 744,659
3 Claims. (Cl. 71—2.7)

This invention relates to compositions and methods for defoliating plants.

In the growing of plant crops, there frequently occurs a need to defoliate the plant. For example, in the growing of cotton plants at the time the bolls are ripening and ready to open, defoliation of the plant not only permits access of the sun to dry the bolls on the lower part of the plant but it also permits more efficient picking of the bolls whether by hand or by machine, prevents staining of the cotton from leaves crushed during picking, and deprives the boll weevil and cotton aphids of their food supply so that the defoliation process thereby reduces the number of these pests which survive to cause damages in the following year.

We have now found that effective defoliation is obtained thru the use of bisxanthates. Unlike most materials heretofore suggested for defoliant use, the bisxanthates cause the leaves to drop while still living instead of requiring complete kill of the foliage before abscission. Thus there is obtained more complete defoliation because of the avoidance of adherence of dead leaves to the plant which frequently results from rapid killing of the leaves before abscission.

The bisxanthate compounds employed in the compositions and methods of the invention can be represented by the formula (1) 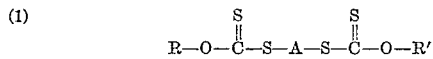

The radical linking the two xanthate groups, that is, the radical represented by the letter A in the above formula is a divalent hydrocarbon radical having an aliphatic carbon atom linkage to the sulfur atom of each xanthate radical. Thus, for example, A can be an alkylene radical such as methylene, ethylene, propylene, hexamethylene, decamethylene, and the like; an alkylidene radical such as ethylidene, and propylidene; an unsaturated aliphatic hydrocarbon divalent radical such as 1,4-but-2-enylene and similar olefinic or acetylenic radicals; an aralkylene radical such as para-xylylene; and an aralkylidene radical such as benzylidene. Preferably, the linking group A is alkylene, and still more preferably, it is lower alkylene, that is, alkylene containing from 1 to 6 carbon atoms.

R and R' in the above formula represent organic radicals linked to the oxygen atoms thru a carbon atom. These organic radicals can be varied widely. R and R' can be alkyl, aryl, aralkyl, alkaryl, cycloaliphatic, and they can contain unsaturated linkages. Preferably R and R' are alike and are alkyl or alkenyl.

The bisxanthates employed in the compositions and methods of the invention are obtained by reacting an alkali metal xanthate with a dibromo compound in the presence of a solvent as will be shown more particularly in the detailed examples to follow.

Examples illustrating the bisxanthate compounds employed in the compositions and methods of the invention are:

Methylene bismethylxanthate
Methylene bisethylxanthate
Methylene bisisopropylxanthate
Methylene bis-n-propylxanthate
Methylene bisallylxanthate
Methylene bis-n-butylxanthate
Methylene bisisobutylxanthate
Methylene bis-sec.butylxanthate
Para-xylylene bis-n-propylxanthate
Hexamethylene bis-n-propylxanthate
1,4-but-2-enylene bis-ethylxanthate The defoliant compositions of the invention are prepared by admixing the bisxanthates with a material of the kind commonly designated in the herbicide and pest control art as an adjuvant, carrier, or diluent. These added materials are sometimes called "fluent carriers" since they aid in adapting the composition for ready application through suitable jets, nozzles, spreaders, and similar devices commonly used in applying pest control compositions and the like. In other words, the bisxanthate is mixed with an additional material or materials of the kind known in art to provide a formulation adapted for ready application by ordinary means.

The dusts, solvents, liquid diluents, wetting, dispersing and emulsifying agents referred to in U.S. Patent 2,426,-417 as "insecticidal adjuvants" can be employed in the preparation of the defoliant compositions of the present invention. Other wetting, dispersing, and emulsifying agents such as those listed in detail in Bulletin E–604 of the Bureau of Entomology and Plant Quarantine of the U.S. Department of Agriculture and such as those set out in the book by McCutcheon entitled "Synthetic Detergents" (McNair-Dorland, 1950) can also be used.

Dust compositions of the invention contain a bisxanthate mixed with a finely divided carrier or dust such as talc, pyrophyllite, natural clay, diatomaceous earths, and other powdered diluents such as those set out in the aforementioned U.S. patent.

Liquid compositions of the invention contain a bisxanthate, either homogeneously dispersed in water or non-solvent carriers, or dissolved in a solvent. To secure homogeneous dispersions in non-solvent liquid diluents, a surface-active agent of the wetting, dispersing, or emulsifying type is used. In fact, the preferred defoliant formulations of the invention, whether in liquid or solid form, contain the active ingredient homogeneously admixed with such a surface-active agent. Generally, the wetting, dispersing or emulsifying agent will not comprise more than about 5 to 15% by weight of the formulation, and with the better surface-active adjuvant materials the percentage will be 5% or less. Usually, the minimum lower concentration will be 0.1%.

The defoliant compositions are applied either as a spray or a dust to the foliage to be removed in accordance with conventional defoliant application practices. The active ingredients are, of course, applied in amount sufficient to exert the desired defoliant action. The dosage or rate of application of the defoliant formulations of the invention will vary somewhat depending upon the particular bisxanthate employed and other factors such as the size of the plants, the luxuriance of the foliage, and the like.

The bisxanthates are, however, extremely effective defoliants at low rates of application. For example, tests with compositions of the invention containing various bisxanthates have been found to effect from about 80 to 100% defoliation within ten days after application to four to six month old cotton plants (plants that have quit blooming and are setting bolls) when applied at a dosage corresponding to about eight pounds per acre of the bisxanthate. Under idea conditions, lesser amounts can be used and, in general, an application of from about two to twenty pounds per acre of the active ingredient is preferred for defoliation of cotton plants.

The invention is further illustrated by reference to the following examples in addition to the examples given above. Parts are parts by weight.

EXAMPLE 1

Methylene bisethylxanthate

Methylene bisethylxanthate was prepared by the reaction of methylene bromide with potassium ethylxanthate in acetone.

To a solution of 26.1 parts of methylene bromide in 120 parts acetone, there was added 50.4 parts of potassium ethylxanthate with stirring and sufficient cooling to maintain the temperature at 20–27° C. After 1.75 hours, the reaction was completed as indicated by the change in color from yellow to white.

The reaction mixture was mixed with 600 parts water, cooled, and crystals separated. The crystals were slurried in 49 parts methanol, filtered, washed with cold methanol to give 32.5 parts of white crystalline methylene bisethylxanthate which melted at 36–38° C. Upon recrystallization from n-hexane, the crystals melted at 39–40° C.

*Analysis.*—Calc'd for $C_7H_{12}O_2S_4$: S, 50.00. Found: S, 50.30.

The compound of this example was soluble in the common organic solvents including hydrocarbons.

By an analogous method, the compounds given in Examples 2 thru 7 below were prepared. The bisxanthates of these examples were obtained as oils which were isolated in methylene chloride solution from which they were recovered by topping in vacuo. They are not distilled and hence the results given are not those of the highly refined products.

Table

| Example | Compound | $n_D^{25}$ | Sulphur Analysis | |
|---|---|---|---|---|
| | | | Calc'd | Found |
| 2 | Methylene bismethylxanthate | 1.6387 | 56.2 | 57.71 |
| 3 | Methylene bis-n-propylxanthate | 1.5893 | 45.10 | 45.42 |
| 4 | Methylene bisisopropylxanthate | 1.5840 | 45.10 | 45.44 |
| 5 | Methylene bis-n-butylxanthate | 1.5734 | 41.05 | 41.07 |
| 6 | Methylene bi-isobutylxanthate | 1.5710 | 41.05 | 42.02 |
| 7 | Methylene bis-sec. butylxanthate | 1.5706 | 41.05 | 41.26 |

EXAMPLE 8

Hydrocarbon oil formulation

A hydrocarbon oil composition is obtained by dissolving methylene bismethylxanthate in refined kerosene to give a solution containing 25% by weight of the bisxanthate compound.

The composition of this example is adapted for application as an oil spray using conventional liquid spray equipment.

EXAMPLE 9

Emulsifiable oil formulation

Methylene bis-n-propylxanthate and a surface-active wetting, dispersing, and emulsifying agent are dissolved in a refined kerosene in the following proportions by weight.

25% methylene bis-n-propylxanthate
20% ethylene oxide-sperm oil alcohol reaction product (surface-active agent)
55% refined kerosene The emulsifiable oil concentrate of this example is readily dispersible in water to obtain aqueous spray compositions which are highly effective in application as defoliants.

EXAMPLE 10

Dust formulation

A defoliant dust is prepared by admixing methylene bisethylxanthate, prepared according to Example 1, with talc in the proportions of about 9 parts by weight of talc for each part by weight of the bisxanthate.

The dust composition of this example is free flowing and is easily broadcast over plants which are to be defoliated.

EXAMPLE 11

Water dispersible formulation

A water dispersible defoliant powder is obtained by admixing methylene bisisobutylxanthate with finely divided fuller's earth and bentonite in the following proportions by weight:

10% methylene bisisobutylxanthate
5% bentonite
85% fuller's earth

The water dispersible powdered formulation of this example is free flowing and is easily dispersed in water to give a relatively stable suspension in an aqueous spray composition.

The defoliant compositions of the invention can include, if desired, other biologically active materials, for example, herbicides such as 3-(p-chlorophenyl)-1,1-dimethyl urea and other pest control materials such as insecticides and fungicides so that the benefits of various materials can be obtained in a single application in accordance with conventional spray or dust application practices in the agricultural field.

The embodiments of the invention in which an exclusive property or privilege is claimed are defined as follows:

1. A method for defoliating cotton plants which comprises applying to the foliage, in amount sufficient to effect defoliation, an organo-bisxanthate having the formula

wherein A is a divalent hydrocarbon radical of up to and including 12 carbon atoms and having an aliphatic carbon atom linkage to the sulfur atom of each xanthate radical and R and R' are hydrocarbon radicals selected from the class consisting of lower alkyl and lower alkenyl radicals.

2. A method for defoliating cotton plants which comprises applying to the foliage of the plants, in an amount sufficient to effect defoliation, an alkylene bis-lower alkylxanthate, said alkylene having up to and including 12 carbon atoms.

3. A method for defoliating cotton plants which comprises applying to the foliage of the plants, in an amount sufficient to effect defoliation, methylene bis-n-propyl xanthate.

References Cited in the file of this patent

UNITED STATES PATENTS 2,600,861    Englund    June 17, 1952
2,615,804    Stewart et al.    Oct. 28, 1952

FOREIGN PATENTS 840,239    Germany    May 29, 1952

OTHER REFERENCES

Kosternaya: "Chemical Abstracts," vol. 33, col. 3760(6), 1939.

Beilstein's Handbuch der Organischen Chemie, 1st supplement to the 4th edition, vol. VI, pp. 46 and 50.